Figure 1:
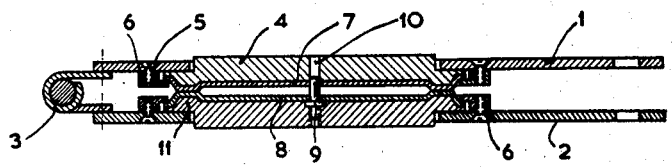

Nov. 29, 1960   P. R. DIJKSTERHUIS ET AL   2,961,699
MOULD FOR HOT-PRESSING THIN FLAT ARTICLES
Filed March 11, 1958

INVENTOR
POPKO REINDER DIJKSTERHUIS
JAN CHRISTOFFEL VAN HOUTEN

BY

AGENT

2,961,699
MOULD FOR HOT-PRESSING THIN FLAT ARTICLES

Popko Reinder Dijksterhuis and Jan Christoffel van Houten, both of Baarn, Netherlands, assignors to North American Philips Company Inc., New York, N.Y., a corporation of Delaware Filed Mar. 11, 1958, Ser. No. 720,667

Claims priority, application Netherlands Mar. 14, 1957

3 Claims. (Cl. 18—5.3)

Our invention relates to moulds for hot pressing thin flat articles having at least surface portions of a thermoplastic synthetic substance, particularly disc-type phonograph records.

Such moulds, which are frequently referred to as book moulds, comprise an upper stamper member and a lower stamper member which are hinged together. In practice such a mould is placed between two heated blocks after the mould has first been provided with a cake of the material to be pressed. Instead of using a cake it is also possible to use a sheet of non-thermoplastic material provided on each side with a thermoplastic cake. The upper and lower stampers of the mould may be the matrices, the negatives of the object to be moulded being provided in the stampers, or the matrices may be secured to the inner sides of the stampers, which is usually done with record moulding. After the pressing operation the blocks are cooled, so that the pressed object hardens; as an alternative, the whole mould is arranged, in its closed state, between two cooled blocks, after which hardening takes place.

It is impossible to prevent the occurrence of edges or burrs on the pressed object after the pressing operation, because the two negatives never fit together accurately. In fact such an accurate fitting of the edges would be undesirable, because it would cause the undesired occlusion of air in the object. These edges or burrs must be removed and especially with mass production this is a costly and time-absorbing operation.

The invention has for its object to make this removing of the edges or burrs simpler and in accordance with the invention this is achieved by using good heat-conducting material for that part of the stamper which is adapted to receive a negative of one side of the object to be moulded whereas a further part, which surrounds completely the first part, is made of a material whose thermal conductivity is poorer than that of the first part. As a result, during the moulding the cake is heated rather rapidly and also rapidly cooled subsequent to moulding; the material pressed out of the mould proper, which material is also heated rapidly, cools considerably more slowly, so that after the hardened object has been removed from the mould, the edges or burrs to be removed are still comparatively soft and can be readily removed, for example by means of a cutting tool. A further advantage is that the complete mould can be more easily manipulated, since the edges of the mould are cooler than the other portions.

According to one embodiment of the invention the moulded object is cooled more rapidly by using as the good heat conducting material, material which also has a low heat capacity.

In accordance with a further aspect of the invention the part of good heat conducting material projects slightly over the surface of the part of bad heat conducting material, at least on the side where the negative is not present. It is thus ensured that the part to be rapidly heated or cooled engages to the optimum the hot or cold pressing blocks, so that an optimum and rapid heat transfer is obtained.

In accordance with another embodiment of the invention the member of good heat conducting material is so connected to the member of poor heat conductivity that the members may move a certain amount relatively to each other in a radial direction to thereby prevent any difficulties due to differences in expansion of the members.

A suitable metal for the manufacture of the part of good heat conductivity is an aluminium alloy, whereas the part of bad heat conductivity is made from preferably high-alloyed steel.

In order that the invention may be clearly understood and readily carried into effect it will now be described in more detail with reference to the accompanying drawing in which—

Figure 2:
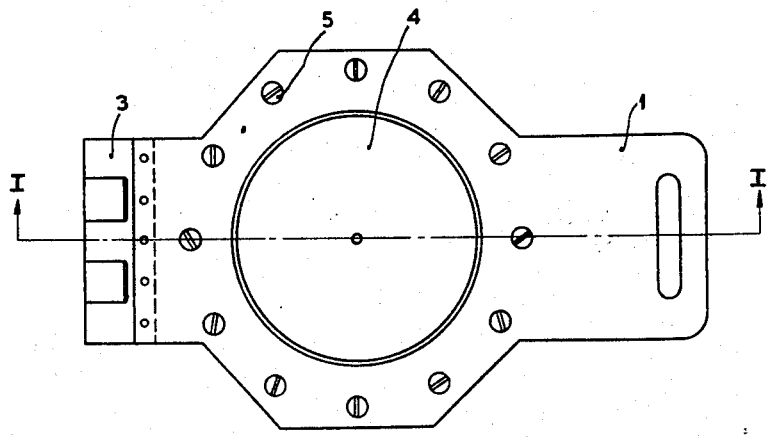

Figure 1 is a sectional view along line I—I of Figure 2 of a mould for pressing records, and Fig. 2 is a plan view of the mould of Figure 1.

The mould shown in the drawings comprises two similar members hinged together at 3 and each comprising a central part 4 of good heat conductivity and an encircling plate-shaped part 1 of poor heat conductivity. Part 1 may be of a high-alloyed steel, for example nickel-chrome steel, whereas part 4 may be of an aluminum alloy. Part 4 projects slightly from the outer surface of part 1 and is secured thereto by means of clamping ring 6 and screws 5. Each of the parts 4 has a central aperture 10, a pin 9 being located in the aperture 10 of the lower part. Part 4 is slightly smaller in diameter than the corresponding aperture in part 1, and sufficient clearance is provided between clamp 6 and the periphery of part 4, so that part 4 may expand slightly with respect to part 1.

If, for example, a record is to be moulded, matrices 7 and 8 are secured to the parts 4 and a cake of thermoplastic material, which may have been preheated, is introduced between the matrices 8. Then the mould, which may also have been preheated, is closed as far as possible and introduced between two hot pressing blocks, after which a pressure is exerted on the mould from both sides. The parts 4, which project slightly from the parts 1 and 2 and which are made of a material which has a good heat conductivity and preferably a low heat capacity, will assume rapidly the desired temperature, whilst the parts 1 and 2 will remain comparatively cold, so that the parts 4 can expand without being hindered by the parts 1 and 2 or the clamping rings 6. The thermoplastic material becomes liquid and thus fills out completely the space in the mould. Thus the ever-available surplus of material, which is required to obtain a satisfactory filling of the mould, is pressed out between the raised edges of the parts 4, so that no air occlusions can be formed. After the mould has been completely filled, it is then removed from between the hot pressing blocks and introduced between two cooled pressing blocks. The parts 1 and 2, which are made of poor heat conducting material, preferably high-alloyed steel, have assumed a lower temperature during the moulding operation between the hot pressing blocks, than the parts 4. While the mould is between the cooled pressing blocks parts 1 and 2 will, however, cool less rapidly. Therefore the clamping rings 6 and the portion of the parts 4 engaging the stampers 1 and 2 will, subsequent to the cooling operation, have a higher temperature than the central portions of the parts 4. The record taken out of the mould after cooling is therefore hard, but the surplus material which is pressed out between the edges is still comparatively soft, and can be removed in a simple manner, for example by means of a knife.

The parts 4 may be made of an aluminium alloy, which has a good heat conduction and which has a low heat capacity and which is moreover satisfactorily resistant to wear. From the point of view of heat technique a magnesium alloy is still better, but this material is more costly and less resistant to wear. The nickel-chromium steel of the parts 1 and 2 has poor heat conduction, a high heat capacity, a high tensile strength and is, moreover, corrosion-free.

In practice it has been found that, when using the invention, and at a matrix temperature of about 165° C., the parts 1 and 2 assume a temperature of not more than about 100° C. If the matrices are cooled, after having been heated, down to about 45° C., the parts 1 and 2 maintain a temperature of about 70° C. long enough to keep the edges of the moulded object soft to a degree such that, after the hardened object has been removed from the mould, the edges can be removed readily.

The drawing shows matrices 7 and 8 secured to the parts 4. As an alternative, the parts 4 may, however, be constructed in the form of matrices. The invention is, moreover, not restricted to a mould for the manufacture of disc-type phonograph records, but extends to moulds for manufacturing other articles which are more or less flat.

What is claimed is:

1. A book mould for hot-pressing thin flat articles from thermoplastic synthetic material comprising a first member, and a second member hinged to said first member, each of said members comprising a central part of a metal of high heat conductivity, a matrix arranged in good heat-conducting relationship with one surface of said central part, and a second part encircling said first part adjacent the periphery of the matrix and being of a metal of poor heat conductivity to thereby retain the heat in the edge portions of the articles.

2. A book mould for hot-pressing thin flat articles from thermoplastic synthetic material comprising a first member and a second member hinged to said first member, each of said members comprising a central part of a metal of high heat conductivity and having a low heat capacity, a matrix arranged in good heat-conducting relationship with one surface of said central part, and a second part encircling said first part adjacent the periphery of the matrix and being of a metal of poor heat conductivity to thereby retain the heat in the edge portions of the articles.

3. A book mould for hot-pressing thin flat articles from thermoplastic synthetic material comprising a first member, and a second member hinged to said first member, each of said members comprising a central part of an aluminum alloy, a matrix arranged in good heat-conducting relationship with one surface of said central part, and a second part encircling said first part adjacent the periphery of the matrix and being of steel to thereby retain the heat in the edge portions of the articles.

References Cited in the file of this patent

UNITED STATES PATENTS 2,605,506    Miller _____ Aug. 5, 1952